United States Patent
Sliskovic et al.

(10) Patent No.: US 12,382,362 B2
(45) Date of Patent: Aug. 5, 2025

(54) METHOD FOR DATA TRANSMISSION AND TECHNICAL SYSTEM

(71) Applicant: SEW-EURODRIVE GMBH & CO. KG, Bruchsal (DE)

(72) Inventors: Maja Sliskovic, Ettlingen (DE); Christian Sauer, Karlsdorf-Neuthard (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 565 days.

(21) Appl. No.: 17/791,541

(22) PCT Filed: Dec. 9, 2020

(86) PCT No.: PCT/EP2020/085204
§ 371 (c)(1),
(2) Date: Jul. 8, 2022

(87) PCT Pub. No.: WO2021/139949
PCT Pub. Date: Jul. 15, 2021

(65) Prior Publication Data
US 2023/0337104 A1    Oct. 19, 2023

(30) Foreign Application Priority Data
Jan. 9, 2020   (DE) ..................... 10 2020 000 049.5

(51) Int. Cl.
*H04W 40/12*   (2009.01)
(52) U.S. Cl.
CPC .................................. *H04W 40/12* (2013.01)
(58) Field of Classification Search
None
See application file for complete search history.

(56) References Cited

U.S. PATENT DOCUMENTS

| | | |
|---|---|---|
| 8,254,266 B2 | 8/2012 | Kutschenreuter |
| 2002/0186665 A1 | 12/2002 | Chaffee et al. |

(Continued)

FOREIGN PATENT DOCUMENTS

| | | |
|---|---|---|
| DE | 102007017515 B3 | 9/2008 |
| DE | 102009043060 A1 | 3/2011 |
| DE | 102010023543 A1 | 12/2011 |

OTHER PUBLICATIONS

International Search Report issued in corresponding International Application No. PCT/EP2020/085204 dated Feb. 25, 2021, pp. 1, English Translation.

(Continued)

*Primary Examiner* — Brian S Roberts
(74) *Attorney, Agent, or Firm* — Carter, DeLuca & Farrell LLP

(57) ABSTRACT

In a method for data transmission between first and second subscribers of a wireless network in a technical system, the network has a plurality of subscribers, and individual communication links between respectively two subscribers of the wireless network are each assigned a characteristic value which describes a probability of correct data transmission via the respective communication link. A plurality of communication paths between the first subscriber and the second subscriber, each including at least one communication link between respectively two subscribers, are each assigned a characteristic value which describes a probability of correct data transmission via the respective communication path. At least one communication path for data transmission is selected depending on the characteristic values assigned to the communication paths. Data is transmitted between the first and second subscribers subscriber via the selected communication path.

19 Claims, 5 Drawing Sheets

(56) References Cited

U.S. PATENT DOCUMENTS

| | | | | |
|---|---|---|---|---|
| 2005/0036487 A1* | 2/2005 | Srikrishna | ............... | H04L 45/00 370/389 |
| 2005/0286425 A1* | 12/2005 | Nagesh | ................... | H04L 45/42 370/238 |
| 2006/0031576 A1* | 2/2006 | Canright | ................. | H04L 45/00 709/240 |
| 2012/0163254 A1* | 6/2012 | Stanwood | ............. | H04W 76/15 370/280 |
| 2013/0111062 A1* | 5/2013 | Jorgensen | ............... | H04L 45/12 709/241 |
| 2014/0313903 A1* | 10/2014 | Kikuzuki | ................ | H04W 8/04 370/238 |
| 2016/0094398 A1 | 3/2016 | Choudhury et al. | | |
| 2017/0034762 A1* | 2/2017 | Dearlove | ............. | H04W 40/24 |

OTHER PUBLICATIONS

Roy, S. et al., "High-thoughput multicast routing metrics in wireless mesh networks" Ad Hoc Networks (Aug. 2008) pp. 878-899, vol. 6, No. 6.

Radi, M. et al., "LINKORD-link ordering-based data gathering protocol for wireless sensor networks" Computing (Jul. 2014) pp. 205-236, vol. 97, No. 3.

International Report on Patentability issued in corresponding International Application No. PCT/EP2020/085204 dated Jul. 12, 2022, pp. 1-7, English Translation.

\* cited by examiner

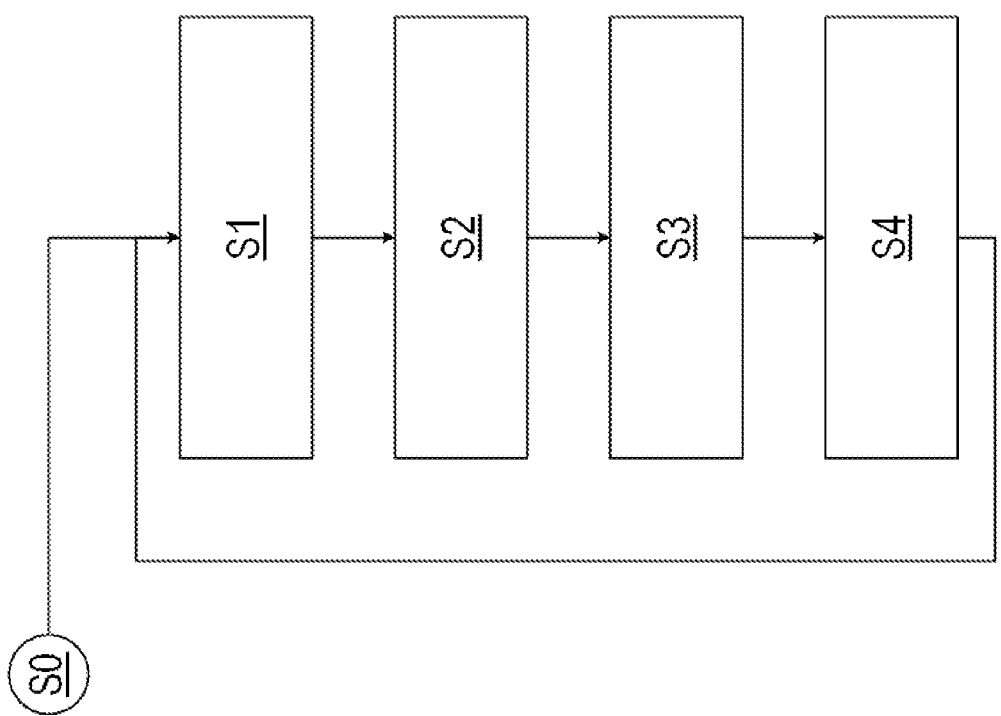

METHOD FOR DATA TRANSMISSION AND TECHNICAL SYSTEM

FIELD OF THE INVENTION

The present invention relates to a method for data transmission between a first subscriber and a second subscriber of a wireless network in a technical system, in which the network includes a plurality of subscribers. The present invention also relates to a technical system includes a wireless network which has a plurality of subscribers.

The technical system is, e.g., an industrial application, for example, a production plant. The subscribers of the wireless network are, e.g., mobile systems of the technical system, for example, autonomous driving vehicles, but also permanently installed subscribers, such as gateways, access points, or base stations. The subscribers can communicate with each other and transfer data via the wireless network.

BACKGROUND INFORMATION

German Patent Document No. 10 2009 043 060 describes a technical system, which includes a base station and a plurality of mobile robots. Each of the mobile robots has a communication device with which a communication link to the base station can be established when the robot is within the transmission range of the base station. The robots are also able to establish communication links with other robots using their communication tools. The robots as well as the base station represent subscribers of a wireless network.

In network engineering, a communication link between two network nodes, i.e., between two subscribers, is usually modeled in binary terms as existing or non-existing. Data is transmitted on the basis of this information via a suitable existing communication link. This is fine for communication over wired networks, since interference, especially from cable shielding, is virtually eliminated. Any necessary distribution of data traffic over multiple communication paths in a meshed network is performed using load-balancing methods, such as the shortest-path bridging method described in the IEEE802.1aq standard.

In a wireless network, describing a single communication link between two subscribers in binary terms as existing or non-existing does not seem to be purposeful. Due to signal fading and possible interference from neighboring systems, especially from other subscribers, a single communication link may be present, but the quality of data transmission over the communication link may not be satisfactory.

German Patent Document No. 10 2010 023 543 describes a method for data transmission between subscribers in a wireless network. In this method, data is transmitted over a data channel in repetitive frames.

German Patent Document No. 10 2007 017 515 describes a method for data transmission between subscribers in a wireless network, in particular, video telephony or VOIP. A method is used to determine the link and route metrics.

U.S. Patent Application Publication No. 2016/0094398 describes a method for data transmission between subscribers in a wired or wireless network.

U.S. Patent Application Publication No. 2002/0186665 describes a method for data transmission between subscribers in a wireless network. In doing so, each node is able to determine routes other nodes.

SUMMARY

Example embodiments of the present invention provide a method for data transmission between a first subscriber and a second subscriber of a wireless network in a technical system, as well as a technical system, in which the quality of data transmission may be improved. This method allows communication between two subscribers who cannot communicate directly with each other, and evaluation of the quality of the indirect connection.

A method is described herein for data transmission between a first subscriber and a second subscriber of a wireless network, for example, a WLAN, in a technical system. The technical system is, e.g., an industrial application, for example a production plant. The wireless network has a plurality of subscribers, e.g., mobile systems, for example, autonomous driving vehicles, as well as installed subscribers such as gateways, access points, or base stations.

According to example embodiments, individual communication links between two subscribers of the wireless network are each assigned a code value. The characteristic value describes a probability of correct data transmission over the respective communication link. The larger the characteristic value, the higher the probability of correct data transmission, and thus the higher the quality of data transmission via the communication link. In this context, a communication link between two subscribers means a direct, immediate connection between the two subscribers without the interposition of another subscriber.

Furthermore, several communication paths between the first subscriber and the second subscriber are each assigned a characteristic value. The characteristic value describes a probability of correct data transmission over the respective communication path. The larger the characteristic value, the higher the probability of correct data transmission, and thus the higher the quality of data transmission via the communication path. A communication path includes at least one direct communication link between two subscribers of the wireless network. The multiple communication paths describe direct connections via multiple communication interfaces. For example, these are the interfaces that use different transmission media, transmission frequencies, modulation types and/or coding.

Depending on the characteristic values assigned to the communication paths, at least one communication path is selected for data transmission between the first subscriber and the second subscriber, and data is transmitted between the first subscriber and the second subscriber via the at least one selected communication path.

In the method described herein for data transmission between a first subscriber and a second subscriber of a wireless network, the quality of data transmission is significantly improved compared to conventional methods for data transmission. If no direct communication link is available between the first subscriber and the second subscriber, or if the quality of data transmission over the direct communication link between the first subscriber and the second subscriber is not satisfactory, a communication path for data transmission is selectable in which the quality of data transmission is satisfactory, if such a path exists. By assigning characteristic values to the communication links and communication paths that describe probabilities of correct data transmissions, the quality of the data transmission can be mapped in greater detail and more realistically than if only the existence of a communication link between the first station and the second station is specified in binary form.

For example, a communication path between the first subscriber and the second subscriber includes exactly one direct communication link between the first subscriber and the second subscriber. However, it is also possible that at least one communication path between the first subscriber and the second subscriber includes a plurality of communication links between every two subscribers of the wireless network. In this case, the communication links are arranged serially. For example, a communication path between the first subscriber and the second subscriber includes a direct communication link between the first subscriber and a further subscriber, and a direct communication link between the further subscriber and the second subscriber.

According to example embodiments, a characteristic value assigned to a communication link between two subscribers at a time is in a range between 0 and 1. If the characteristic value is equal to 1, the data transmission over the communication link is completely correct. If the characteristic value is equal to 0, the data transmission through the communication link is impossible. A characteristic value assigned to a communication path is calculated as the product of the characteristic values of the individual serially arranged communication links of the communication path. The characteristic value assigned to a communication path is thus also in a range between 0 and 1.

For example, a communication path includes a first communication link to which a characteristic value P1 is assigned and a second communication link to which a characteristic value P2 is assigned. The communication path is assigned a characteristic value P, which is calculated according to the relationship:

$$P=P1*P2$$

According to example embodiments, a communication path between the first subscriber and the second subscriber is selected for data transmission which is assigned the highest characteristic value of the characteristic values assigned to the communication paths. For example, exactly one communication path is selected. If there are several communication paths with the same characteristic values, additional criteria are used for selection. For example, in this case, the communication path that has the least number of direct communication links is selected.

According to example embodiments, a communication path between the first subscriber and the second subscriber is selected for data transmission whose characteristic value exceeds a predetermined limit value. For example, exactly one communication path is selected. If there are several communication paths whose characteristic values exceed the limit value, additional criteria are used for selection. For example, in this case, the communication path which is assigned the highest characteristic value or which has the lowest number of direct communication links is selected.

According to example embodiments, a plurality of communication paths are selected for data transmission. The selected communication paths form a communication group. A characteristic value is assigned to the communication group, which describes a probability of correct data transmission via the communication paths of the communication group.

According to example embodiments, a plurality of communication paths are selected for data transmission, forming a communication group, in which the characteristic value assigned to the communication group exceeds a predetermined limit value.

According to example embodiments, the communication paths of a communication group are arranged in parallel. The communication paths of the communication group are thus redundant.

According to example embodiments, a characteristic value assigned to a communication path is in a range between 0 and 1. If the characteristic value is equal to 1, the data transmission via the communication path is completely correct. If the characteristic value is equal to 0, the data transmission via the communication path is impossible. A characteristic value assigned to a communication group is thereby calculated as the complement of a product of the complementary characteristic values of the individual communication paths of the communication group. The difference to 1 is referred to as the complement. The characteristic value assigned to a communication group is thus also in a range between 0 and 1.

For example, a communication group comprises a first communication path to which a characteristic value P1 is assigned and a second parallel communication path to which a characteristic value P2 is assigned. The communication group is assigned a characteristic value P, which is calculated according to the relationship:

$$P=1-(1-P1)*(1-P2)$$

According to example embodiments, the assignment of the characteristic values to the communication paths between the first subscriber and the second subscriber and/or the selection of the at least one communication path for data transmission are performed by the first subscriber. The assignment of the characteristic values and the selection of the communication path thus take place decentrally. For example, each subscriber of the wireless network assigns a respective characteristic value to the communication paths from the respective subscriber to other subscribers, e.g., to all other subscribers. If required, the respective subscriber then selects a communication path to another subscriber.

According to example embodiments, the assignment of the characteristic values to the communication paths between the first subscriber and the second subscriber and/or the selection of the at least one communication path for data transmission are performed by a central computer. The assignment of the characteristic values and the selection of the communication path thus take place centrally. For example, the central computer assigns a password value to each of the communication paths from all subscribers of the wireless network to other subscribers, e.g., to all other subscribers. If necessary, the central computer selects a communication path from one subscriber to another.

A technical system according to an example embodiment of the present invention includes a wireless network having a plurality of subscribers. In this context, the technical system is configured to carry out the method described herein.

According to example embodiments, at least one of the subscribers is arranged as a mobile system, e.g., as an autonomously driving vehicle.

Example embodiments of the present invention are described in more detail below with reference to the appended schematic Figures.

BRIEF DESCRIPTION OF THE DRAWINGS

FIG. 5 is a flowchart schematically illustrating a method for data transmission.

DETAILED DESCRIPTION

Figure 1:
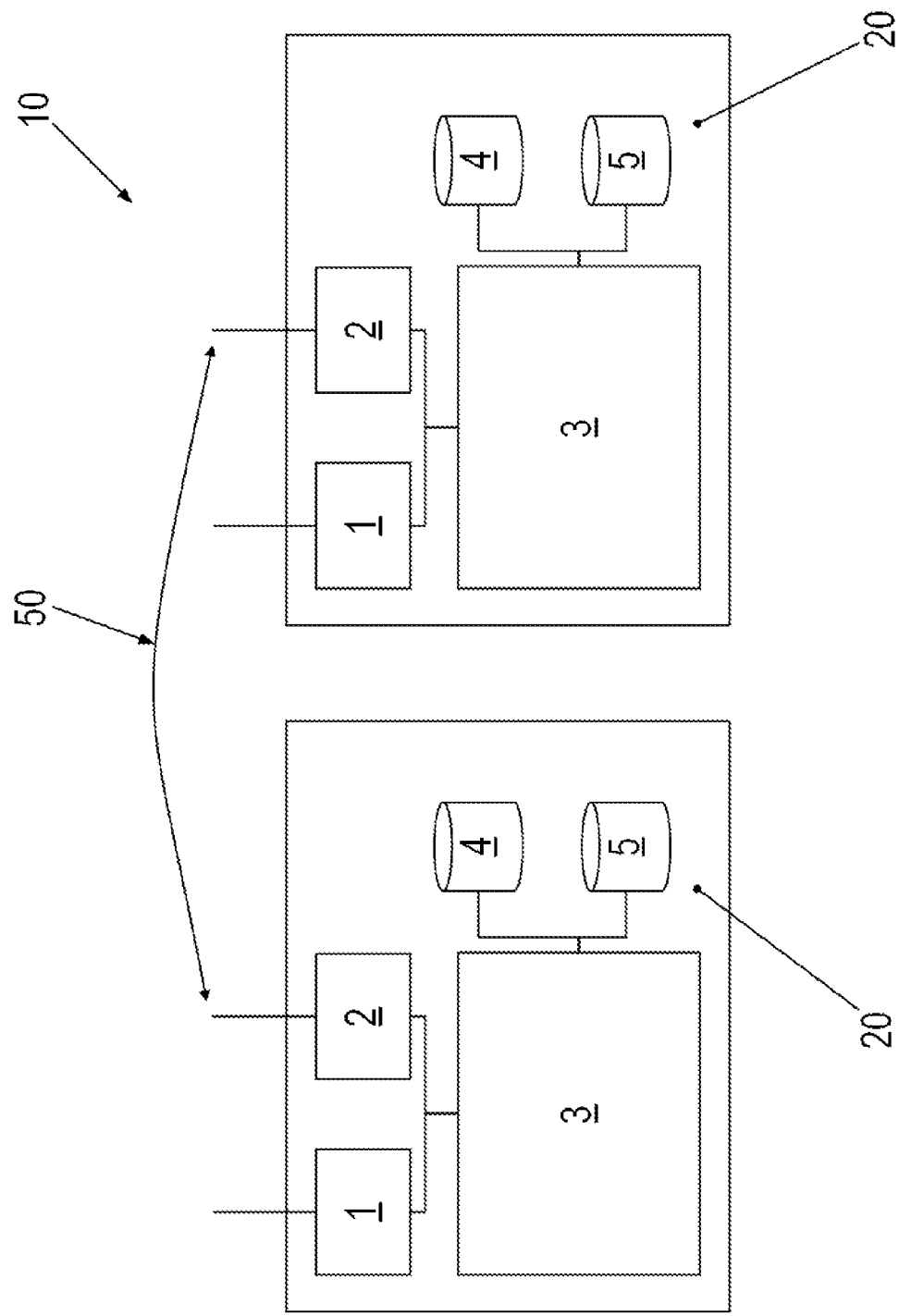
FIG. 1 schematically illustrates a technical system.

FIG. 1 schematically illustrates a technical system 10. In the present example embodiment, the technical system 1 is arranged as an industrial application, for example, a production plant. The technical system 10 has a wireless network, for example, a WLAN. The wireless network includes a plurality of subscribers 20, e.g., mobile systems, for example, autonomous driving vehicles, as well as installed subscribers such as gateways, access points, or base stations. Data exchange between the subscribers 20 is possible via the wireless network.

The subscribers 20 each have a first wireless communication interface 1 and a second wireless communication interface 2. The communication interfaces 1, 2 are, for example, WiFi, Bluetooth, ZigBee, light, or radar interfaces. For example, a communication link 50 exists between the second wireless communication interfaces 2 of the subscribers 20. The communication interfaces 1, 2 are not necessarily compatible with each other. For example, wireless communication between a first wireless communication interface 1 and a second wireless communication interface 2 is not possible.

Figure 2:
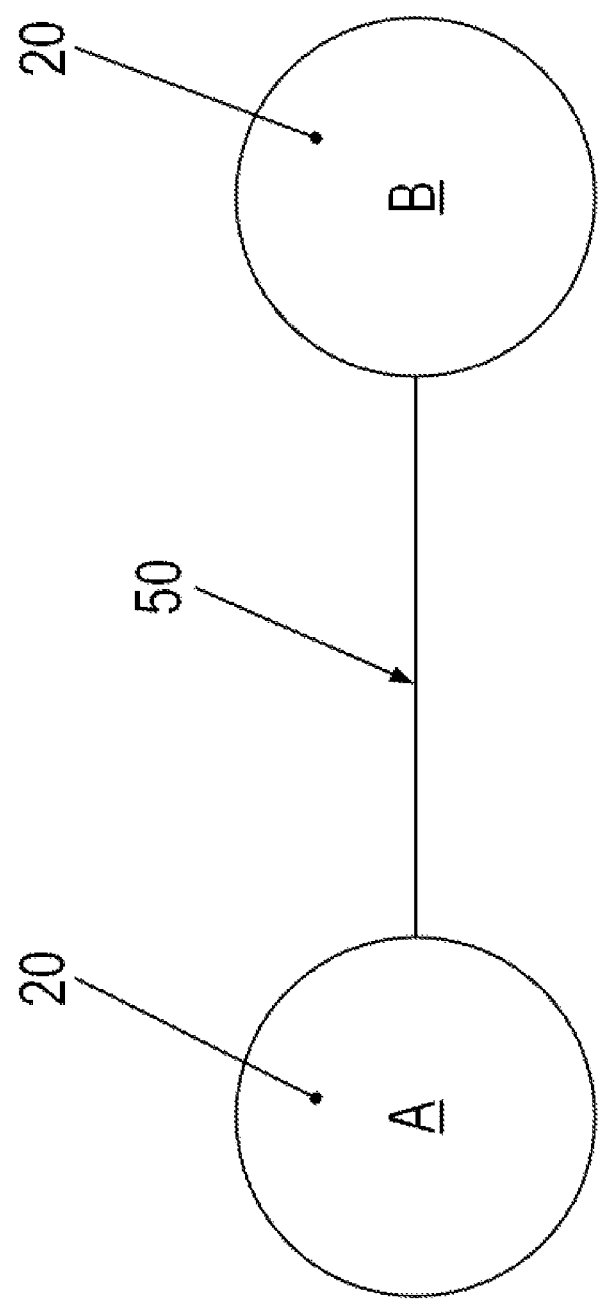
FIG. 2 schematically illustrates a communication link.

FIG. 2 schematically illustrates a communication link 50 between a first subscriber 20, which is designated "A", and a second subscriber 20, which is designated "B". The communication link 50 is a direct, immediate connection between the two subscribers 20 without the interposition of another subscriber 20.

The communication link 50 is assigned a characteristic value that describes a probability of correct data transmission over the communication link 50. The characteristic value, designated here as "PAB", lies in a range between 0 and 1.

Figure 3:
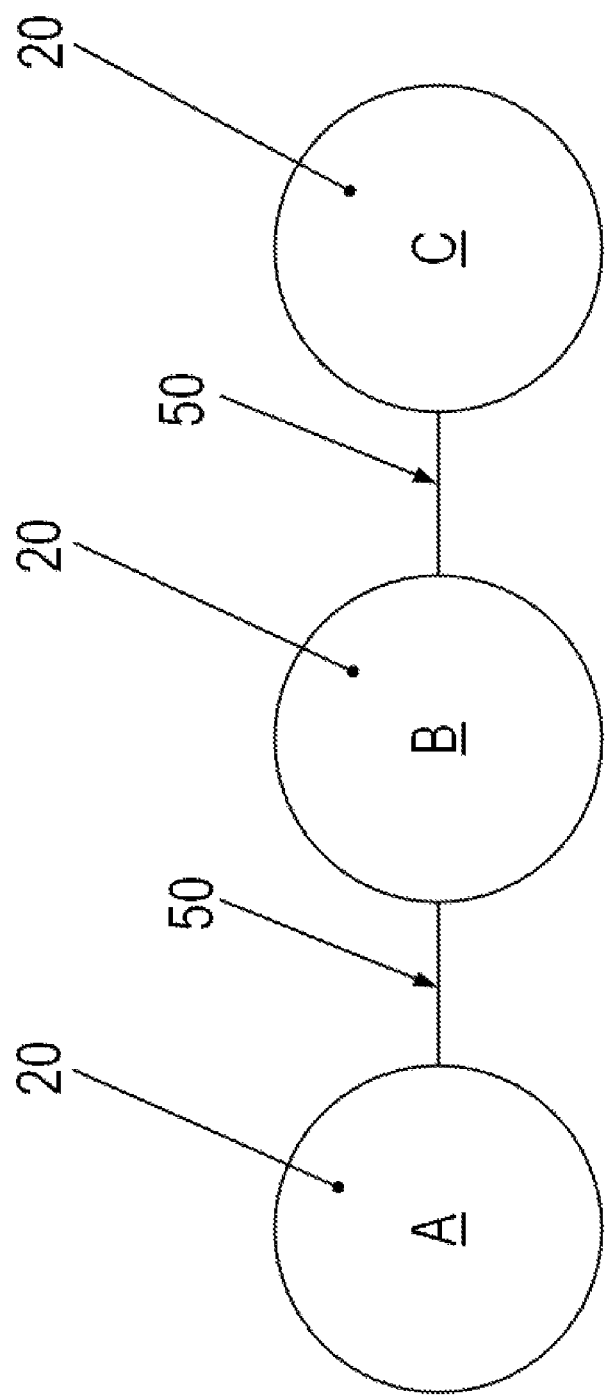
FIG. 3 schematically illustrates a communication path.

FIG. 3 schematically illustrates a communication path between a first subscriber 20, which is designated with "A", and a second subscriber 20, which is designated with "C".

The communication path includes a communication link 50 between the first subscriber 20 designated with "A" and another subscriber 20 designated with "B", which is assigned a characteristic value designated as "PAB". The communication path additionally includes a communication link 50 between the further subscriber 20 designated with "B" and the second subscriber 20 designated with "C", which is assigned a characteristic value designated as "PBC". The communication links 50 are arranged in series. The communication path is assigned a characteristic value "PAC", which is calculated as the product of the characteristic values of the individual communication links 50 according to the relationship:

$$PAC=PAB*PBC$$

Figure 4:
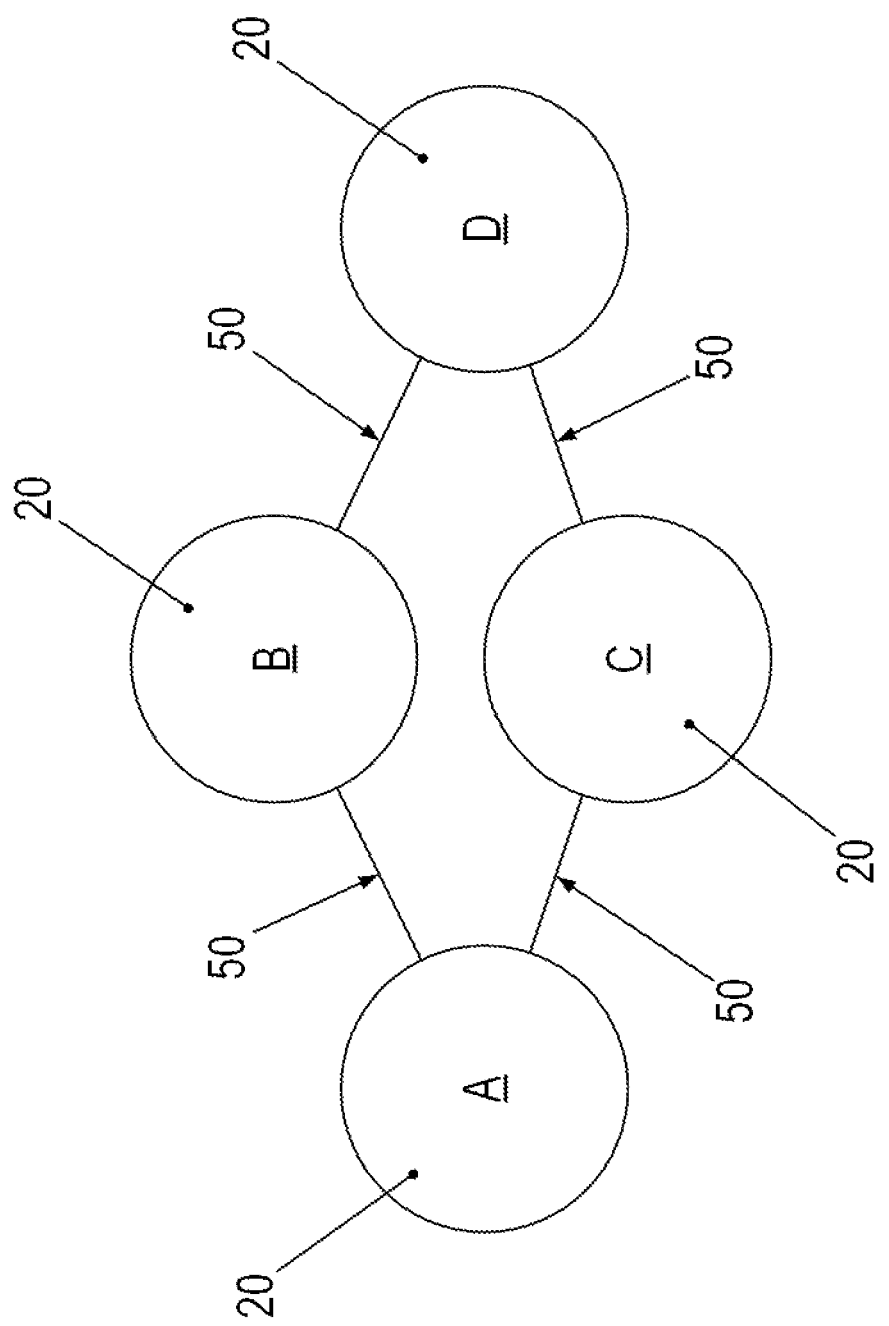
FIG. 4 schematically illustrates a communication group.

FIG. 4 schematically illustrates a communication group between a first subscriber 20, which is designated with "A", and a second subscriber 20, which is designated with "D". The communication group includes two parallel communication paths, which are therefore redundant.

The communication path includes a communication link 50 between the first subscriber 20 designated with "A" and another subscriber 20 designated with "B", which is assigned a characteristic value designated as "PAB". The communication path additionally includes a communication link 50 between the further subscriber 20 designated with "B" and the second subscriber 20 designated with "D", which is assigned a characteristic value designated as "PBD". The communication links 50 are arranged in series.

The other communication path includes a communication link 50 between the first subscriber 20 designated with "A" and another subscriber 20 designated with "C", which is assigned a characteristic value designated as "PAC". The other communication path additionally includes a communication link 50 between the further subscriber 20 designated with "C" and the second subscriber 20 designated with "D", which is assigned a characteristic value designated as "PCD". The communication links 50 are arranged in series.

The communication group is assigned a characteristic value "PAD", which is calculated as the complement of a product of the complementary characteristic values of the individual communication paths according to the relationship:

$$PAD=1-(1-PAB*PBD)*(1-PAC*PCD)$$

FIG. 5 illustrates a flowchart with steps of a method for data transmission. The method starts with a starting step S0.

In a step S1, each subscriber 20 of the wireless network acquires information about communication link 50 to neighboring directly reachable subscribers 20 during operation of the wireless network. This information is captured, for example, in the form of a packet error rate or a complementary packet error rate. In this context, it is possible to generate substitute traffic when there is no communication via the wireless communication interfaces 1, 2 of the subscribers 20. The replacement traffic includes, for example, Beacons or Hello messages of different network protocols.

The packet error rate is determined over a defined period of time as the ratio of messages not received during this period and a total number of expected messages. The time period typically ranges from 1 s to 100 s. The time period is chosen to be smaller in very mobile networks, when subscribers move relatively quickly and frequently, and larger in static applications with substantially static subscribers 20. A small period of time allows for quick updating of information. A large time period allows a high resolution in the packet error rate. In the messages where time-critical information is transmitted, where a maximum latency is specified, the communication quality is calculated in a period of time whose duration corresponds to this latency or a part of the latency.

In a step S2, each subscriber 20 of the wireless network exchanges information about the quality of all communication links 50 with directly reachable subscribers 20. The quality of a communication link 50 is defined by a probability with which a data packet can be transmitted over this communication link 50. The probability is calculated as the complement of the previously recorded packet error rate. For example, each communication link 50 is assigned a characteristic value which describes the probability, and which lies in a range between 0 and 1. Non-existing communication links 50 between two subscribers 20 are assigned the characteristic value 0.

The information about the quality of the communication link 50 received from directly reachable subscribers 20 of the wireless network is summarized into network link information about direct link qualities. Collection and aggregation into network connection information can be decentralized or centralized. With decentralized aggregation, a single point of failure is ruled out, resulting in higher robustness of the overall system. With centralized aggregation, because of more available storage resources, the information can be stored completely, even for large wireless networks with a large number of subscribers 20.

In a step S3, the quality for indirect connections within the network is calculated from the network connection information. These calculations take into account the transmission probabilities over lined-up and parallel connections. For example, a communication path including a plurality of serially arranged communication links 50 is assigned a characteristic value calculated as a product of the characteristic values of the individual serially arranged communication links 50. For example, a communication group including a plurality of communication paths arranged in parallel is assigned a characteristic value calculated as the complement of a product of the complementary characteristic values of the individual communication paths of the communication group. The calculation method can exclude loops within the communication paths, leading to more efficient communication.

In a step S4, an evaluation of possible routes from individual subscribers 20 to other subscribers 20 of the wireless network is performed based on the available network connection information. For example, at least one communication path for data transmission between a first subscriber 20 and a second subscriber 20 is selected depending on the characteristic values assigned to the communication paths and communication groups.

According to example embodiments, the communication path for data transmission between the first subscriber 20 and the second subscriber 20 is selected to which the highest characteristic value is assigned. Thus, the most reliable communication path from the first subscriber 20 to the second subscriber 20 is selected, which has the highest transmission probability. If two communication paths have identical transmission probabilities, the shorter communication path is selected. The length of a communication path is defined by the number of serial communication links 50 of the communication path. If two communication paths have identical transmission probabilities and identical lengths, the communication path that was detected first is selected.

According to example embodiments, a communication group is selected for data transmission between the first subscriber 20 and the second subscriber 20, which includes a plurality of parallel communication paths. For example, the characteristic value assigned to the communication group exceeds a specified limit value. For example, the number of redundant communication paths required is calculated for a transmission probability specified by a data packet or an application, to which the threshold corresponds. Several advantages result from selecting a communication group with multiple redundant communication paths. Especially for time-critical packets, transmission reliability is achieved by redundant communication paths instead of repeating the message. The length of the available communication paths can be limited if the latency requirement for the transmission of a data packet demands it. By using redundant subpaths, the transmission probability is increased, even if the destination of the communication path is not fully redundantly connected.

The entire wireless network is assessable, while only information for direct communication links 50 is recorded. This reduced need for network monitoring reduces interference with primary communications. Even complex multi-hop routes can be selected without a full network scan. This reduces the latency for transmission in the network while keeping the overhead low. Communication path descriptions for transmitted packets are obtained by the distance-vector method, and the method described above optimizes the distance-vector method because individual subscribers 20 are able to respond to topological changes beyond their immediate neighborhood, and available network information can be exchanged more often for the same network load. In the distance vector method, a sent packet contains only the final destination, but no information about the route to be used. Each subscriber 20 that is to forward the packet uses the network information known to it to determine the best route. This method is used here because it is possible and likely that topological information about distant parts of the network is out of date at a sending subscriber 20. Being able to update the route of a packet as it gets closer to the receiver improves the probability of a successful transmission.

The decentralized availability and analysis of connection information increases the robustness of the overall system. Incompatible communication standards can be mathematically combined to form an overall network, allowing cross-interface evaluation of the wireless network. The incompatible, redundant communication standards between two communication standards are considered parallel communication paths. Link quality is modeled relatively simply by the ratio of the number of messages received to the number of messages sent, or expected, regardless of why a message was not received. Possible causes are, for example, interference from similar systems, noise, or fading of the signal.

The method is a procedure for choosing routes, especially communication paths, for messages through complex multi-hop networks. The method is capable of calculating the reliability of networks based on stochastic data for local communication links 50, i.e., communication links 50 with direct topological neighborhood of subscribers 20, and for global links, i.e., links via communication paths to indirectly reachable subscribers 20. Based on the calculated reliabilities, the most reliable communication path can be selected. The system is capable of both calculating the probability of a successful transmission between a sender and a receiver and determining the most reliable communication path between them.

Each subscriber 20 performs the operations listed below to distribute information within the wireless network. First, the overall network is captured directly and indirectly based on the available information in step S1. In step S2, the information is exchanged. In step S3 the information is evaluated. Then, in step S4, the most reliable routes to all other subscribers 20 are searched. Based on these routes found and the information about the overall network, messages are sent into and received from the network. If global network information has been received, it will be included as an update. Local information can also be updated based on the data sent and received. The assessment is repeated based on this updated information.

In the method for evaluating the overall network, a network with n subscribers 20 is represented as an example in the form of a connection matrix of dimension n*n. This connection matrix contains characteristic values describing the probabilities for a successful direct data transmission between all possible communication links 50. These characteristic values lie in the range between 0 (included) and 1 (included). A characteristic value "0" signals the impossibility of direct transmission, a characteristic value "1" means guaranteed error-free transmission. The model is able to overlay parallel networks using different communication methods and calculate the transmission probability over indirect links. Indirect connections mean that messages are forwarded through subscribers 20 in the network via communication paths. In doing so, the model is able to view the network without loops. This means that after a message has been transmitted over a connection A-B, for example, it will not be retransmitted over connection A-B, nor over connection B-A.

The system is able to detect and use redundant communication paths. Communication paths can be redundant in different manners. A non-redundant communication path means that there is only exactly one connection between a sender and a receiver. A communication path can also be partially redundant or fully redundant. Partially redundant means that parts of the communication path between sender and receiver can be mapped via parallel communication paths. In the following, no distinction is made whether a part of a communication path is single redundant or multiply redundant. Redundancy can be expressed by this system both by sending through other subscribers 20, and by using other communication methods. Finally, there are fully-redundant communication paths, where complete alternate routes exist between the sender and receiver. Complete redundancy would be expressed primarily by the fact that there are no common subscribers 20 on at least two completely redundant communication paths.

As explained in step S4 of the procedure, two different executions for selecting a route are possible. The first version is used when there is no target transmission probability by the application. The aim here is to achieve the highest possible transmission probability, taking into account the current network load when allocating redundant routes. If a target transmission probability is specified by the application, the number of redundant communication paths used can be limited, for example, to the 3 most reliable communication paths.

Many network protocols contain so-called Hello or Beacon messages, which can be used by the method described herein. These are messages sent at regular intervals by each subscriber in the network. They are sent as broadcasts and received by any other subscriber within range of the receiver. In wireless networks, this range is usually a distance, which is also due to the existence of signal-attenuating obstacles. A subscriber observes how often he receives the Hello messages or Beacons of other subscribers. Furthermore, it is assumed that each subscriber knows which other subscribers are in the wireless network. This information is obtained, for example, through the programming or local configuration of the subscribers or is requested from a higher-level system before commissioning. Subsequent insertion of subscribers into a network is possible.

If subscriber p has been watching the network for a certain period of time, it has received a number Nn of a possible number Mn of Beacons from subscriber n during that time. For these direct communication links 50, this results in a reliability of:

$$R_{pn}^1 = \frac{N_n}{M_n}$$

The following applies: $R_{pp}^1 = 1$. Combined with the information about received packets from all other subscribers, this results in a connection vector with i+1 subscribers in the network:

$$R_p^1 = (R_{p0}^1 \ldots R_{pi}^1)$$

This is referred to as local network information in the following. This information is sent from the subscribers into the network to the other subscribers. This allows subscribers to obtain information about indirect connections.

Connection information to subscribers from which no messages have been received, i.e., for which $R_{pn}^1 = 0$ is valid, is not sent along, for example, which saves network resources. Depending on the type of network used, the network load and the configuration of the system described herein, this information is distributed in the network in different manners.

For example, the probabilities are entered in a matrix. The addresses of known subscribers are assigned to the indices of the matrix. The advantage of this configuration as a calculation by matrix is that it can be implemented very efficiently in a computer system.

If a subscriber receives this local information from other subscribers, they can add it to their own local information:

$$R^1 = \begin{pmatrix} R_0^1 \\ \vdots \\ R_i^1 \end{pmatrix} = \begin{pmatrix} R_{00}^1 & \cdots & R_{0i}^i \\ \vdots & \ddots & \vdots \\ R_{i0}^1 & \cdots & R_{ii}^i \end{pmatrix}$$

This is the global connection information for direct communication links. The respective subscriber updates a line when new information is available. $R^1$ is a square matrix, since for every connection A-B stored in the matrix, there must also be a connection B-A stored. $R^1$ does not have to be a symmetric matrix. For determining multi-hop routes in the network, $R^1$ is further processed.

First, the contents of $R^j$ (initially=$R^1$) are transferred to dR, a variant of R, which is modified in the further course. j is the maximum number of communication links for which the network is currently being examined. The depth of the network refers to the maximum possible number of forwardings on a route. It examines how subscriber connectivity is evolving i for d communication links. This method can be repeated for other communication links, as well as for the remaining subscribers.

With $dR = dR \cdot K_S(I)$ $$K_S(A) = \begin{pmatrix} 1 & \cdots & 1 \\ \vdots & \ddots & \vdots \\ 1 & \cdots & 1 \end{pmatrix} - \begin{pmatrix} a_{11} & \cdots & a_{1n} \\ \vdots & \ddots & \vdots \\ a_{m1} & \cdots & a_{mn} \end{pmatrix}$$

and

Here, · is an operator for element-wise multiplication. I defines the unit matrix of a certain quantity, in the present case the unit matrix of the quantity (i+1):

$$I = \begin{bmatrix} 1 & \cdots & 0 \\ \vdots & \ddots & \vdots \\ 0 & \cdots & 1 \end{bmatrix}$$

This step first removes the connections of nodes to themselves from the matrix, or sets them to zero, for the further calculation steps. Where $K_S(A)$ is the element-wise stochastic complement of the probabilities in the matrix A. The information of the connections of the subscriber i is stored as a vector $c_i$, while the information is removed from the matrix by setting the column i from dR to 0. The following procedure is performed for each communication link d, for which the network is to be examined:

It is $c_i$ enlarged to a square matrix using $C_i = B(c_i)$:

$$C_i = B(c_i) = \begin{pmatrix} C_{i11} = c_1 & \cdots & C_{i1n} = c_1 \\ \vdots & \ddots & \vdots \\ C_{in1} = c_n & \cdots & C_{inn} = c_n \end{pmatrix}$$

Element-wise multiplication is used to link the probabilities of two successive communication links: $D_i = d_R \cdot C_i$. The stochastic complement of this matrix is multiplicatively collapsed in the row direction to obtain the connection probabilities of the node under consideration: $D_i = \overrightarrow{\Pi K_S(D_i)}$; with:

$$\overrightarrow{\prod A} = \begin{pmatrix} \prod_{j=1}^{n} a_{1j} \\ \vdots \\ \prod_{j=1}^{n} a_{mj} \end{pmatrix}$$

The result is combined with the complement of the previously calculated connection probabilities $c_1$ $C_b=[K_S(c_i), D_i]$ and again multiplicatively collapsed in series direction and the complementary probability is calculated:

$C_b = K_S(\overrightarrow{\prod C_b})$

The combination, respectively, the connection, of second vectors/matrices is calculated as follows:

$$[\vec{a}, \vec{b}] = \begin{pmatrix} a_1 & b_1 \\ \vdots & \vdots \\ a_n & b_n \end{pmatrix} \quad {}^i[\vec{a}, B] = \begin{pmatrix} b_{11} & \cdots & b_{1i}=a_i & \cdots & b_{1N} \\ \vdots & \ddots & \vdots & \ddots & \vdots \\ b_{n1} & \cdots & b_{ni}=a_n & \cdots & b_{nN} \\ \vdots & \ddots & \vdots & \ddots & \vdots \\ b_{N1} & \cdots & b_{Ni}=a_N & \cdots & b_{NN} \end{pmatrix}$$

After all these operations, any communication link that has already been used for transmission in this case will be removed from dR. This removal of already included communication links keeps the considered network loop-free and the calculated probabilities correct. A loop in a network would always mean that a communication link was considered twice in at least one direction. Removing communication links whose transmission probabilities have already been included in the reachability probability of a node thus prevents loops from forming in the mathematical analysis and distorting the achieved reachability probability of a node.

$dR = dR \cdot |\emptyset_i|(C_i) \cdot |\emptyset_i|(C_i^T)$

Here, · is an operator for element-wise multiplication. $C_i^T$ is the transposed matrix $C_i$.

Here $|\emptyset_i|(A)$ describes the setting of elements of a matrix to 1 or 0, depending on their content.

$$|\emptyset_i|(A) = \begin{pmatrix} \emptyset(a_{11}) & \cdots & \emptyset(a_{1n}) \\ \vdots & \ddots & \vdots \\ \emptyset(a_{m1}) & \cdots & \emptyset(a_{mn}) \end{pmatrix} \quad \emptyset_i(x) = \begin{cases} 1; x \leq i \\ 0; \text{otherwise} \end{cases}$$

It will use the new probabilities for the next execution of the algorithm $c_i = C_b$. Where the probability to send to itself is set back to 0 ($C_b = C_b \cdot K_S(I)$). This allows connection probabilities to be calculated for longer communication paths j.

To evaluate the overall network, this procedure is performed for each known subscriber, up to the longest relevant number of communication links. The method is optimized for computer-based computation for very large networks and can be fully vectorized as well as parallelized.

LIST OF REFERENCE NUMERALS

1 first wireless communication interface
2 second wireless communication interface
3 data processing unit
4 first data storage unit
5 second data storage unit
10 technical system
20 subscribers
50 communication link

The invention claimed is:

1. A method for data transmission between a first subscriber and a second subscriber of a wireless network in a technical system, the network including a plurality of subscribers, comprising:
   assigning a first characteristic value to each individual communication link between two subscribers of the wireless network, the first characteristic value describing a probability of correct data transmission via the communication link;
   assigning a second characteristic value to each of a plurality of communication paths between the first subscriber and the second subscriber, each communication path including at least one communication link between two subscribers, the second characteristic value describing a probability of correct data transmission via the communication path;
   selecting at least one communication path for data transmission depending on the second characteristic values assigned to the communication paths; and
   transmitting data between the first subscriber and the second subscriber via the selected communication path;
   wherein a set of the communication paths for data transmission is selected to form a communication group, the communication group being assigned a third characteristic value describing a probability of correct data transmission via the communication paths of the communication group.

2. The method according to claim 1, wherein the communication path includes a plurality of communication links arranged in series.

3. The method according to claim 2, wherein the first characteristic value is in a range between 0 and 1, and the second characteristic value is calculated as a product of the first characteristic values of individual serially arranged communication links of the respective communication path.

4. The method according to claim 1, wherein the communication path is selected for data transmission to which a highest second characteristic value of the second characteristic values assigned to the communication paths is assigned.

5. The method according to claim 1, wherein exactly one communication path is selected for the data transmission to which a highest second characteristic value of the second characteristic values assigned to the communication paths is assigned.

6. The method according to claim 1, wherein the communication path is selected for data transmission having a second characteristic value that exceeds a predetermined limit value.

7. The method according to claim 1, wherein exactly one communication path is selected for data transmission having a second characteristic value that exceeds a predetermined limit value.

8. The method according to claim 1, wherein the third characteristic value of the communication group exceeds a predetermined limit value.

9. The method according to claim 1, wherein the communication paths of the communication group are arranged in parallel.

10. The method according to claim 1, wherein the second characteristic value is in a range between 0 and 1, and the third characteristic value is calculated as a complement of a product of complementary second characteristic values of individual communication paths of the communication group.

11. The method according to claim 1, wherein the assigning of the second characteristic values to the communication paths between the first subscriber and the second subscriber and/or the selecting of the communication path for data transmission is performed by the first subscriber.

12. The method according to claim 1, wherein the assigning of the second characteristic values to the communication paths between the first subscriber and the second subscriber and/or the selecting of the communication path for data transmission is performed by a central computer.

13. A system, comprising:
   a wireless network including a plurality of subscribers, wherein the system is adapted to perform the method recited in claim 1.

14. The system according to claim 13, wherein at least one of the subscribers is arranged as a mobile system.

15. The system according to claim 13, wherein at least one of the subscribers is arranged as an autonomously driving vehicle.

16. The system according to claim 13, wherein the assigning, the selecting, and the transmitting are performed by at least one of the subscribers.

17. The system according to claim 13, wherein the assigning and the selecting are performed by a central computer of the system.

18. The system according to claim 13, wherein the assigning, the selecting, and the transmitting are performed by at least one of the subscribers and/or by a central computer of the system.

19. The method according to claim 1, wherein the third characteristic value exceeds a predetermined threshold value.

* * * * *